No. 871,521.

PATENTED NOV. 19, 1907.

G. R. OWINGS.
CAR FENDER.
APPLICATION FILED MAR. 7, 1907.

2 SHEETS—SHEET 1.

No. 871,521.
PATENTED NOV. 19, 1907.
G. R. OWINGS.
CAR FENDER.
APPLICATION FILED MAR. 7, 1907.
2 SHEETS—SHEET 2.
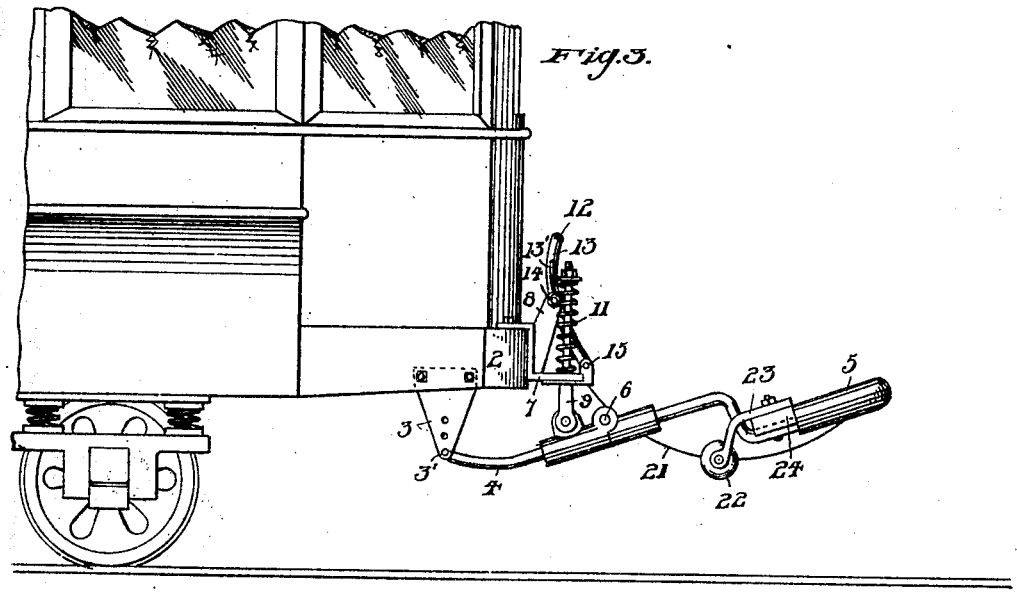
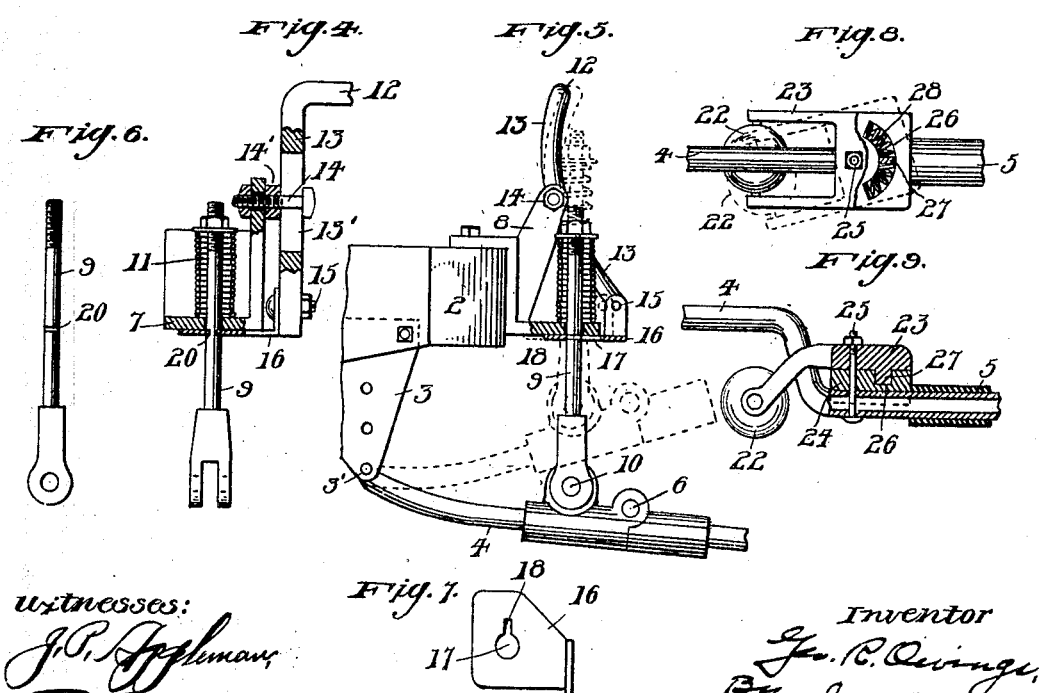
Witnesses:
Inventor
Geo. R. Owings,

UNITED STATES PATENT OFFICE.

GEORGE R. OWINGS, OF PITTSBURG, PENNSYLVANIA, ASSIGNOR OF TWO-EIGHTHS TO LOUIS H. WENTZ, TWO-EIGHTHS TO CHARLES J. BOSAU, AND ONE-EIGHTH TO JOHN S. GILLESPIE, ALL OF PITTSBURG, PENNSYLVANIA.

CAR-FENDER.

No. 871,521.     Specification of Letters Patent.     Patented Nov. 19, 1907.

Application filed March 7, 1907. Serial No. 361,042.

*To all whom it may concern:*

Be it known that I, GEORGE R. OWINGS, a resident of Pittsburg, in the county of Allegheny and State of Pennsylvania, have invented certain new and useful Improvements in Car-Fenders, of which the following is a specification.

One object of this invention is to provide a fender wherein the forwardly extending guard portion will be automatically raised by the weight of a person or other object falling onto the fender, preventing the latter from rolling or falling therefrom.

It is well known that while fenders are frequently effective in picking up persons, the victims frequently fall off after being picked up and are seriously injured.

A further object of the invention is to provide roller supports or casters of improved form which are adapted to so oscillate as to follow the curvatures of the track but which are self-centering, and thus normally maintained in position on or above the track.

Figure 1:
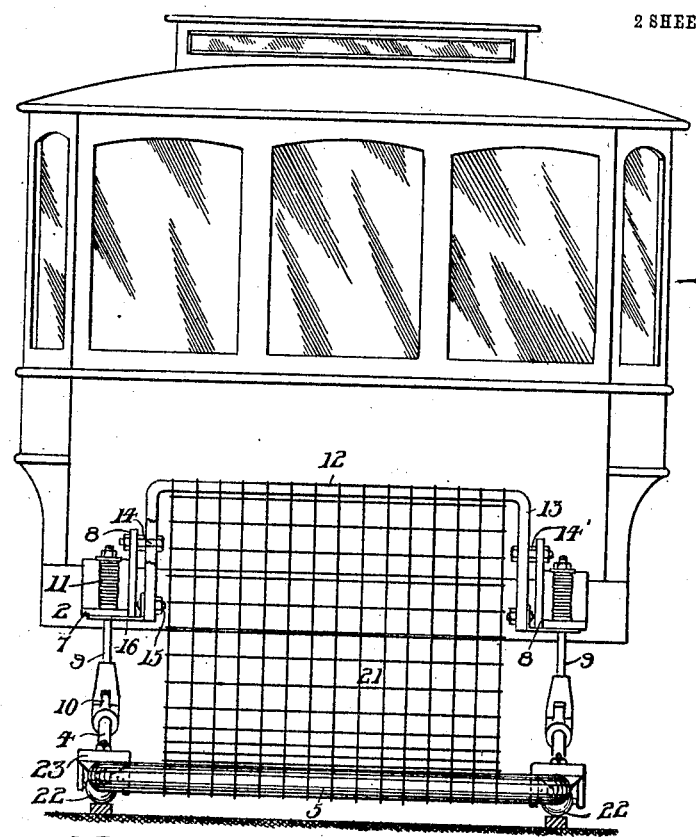
Figure 2:
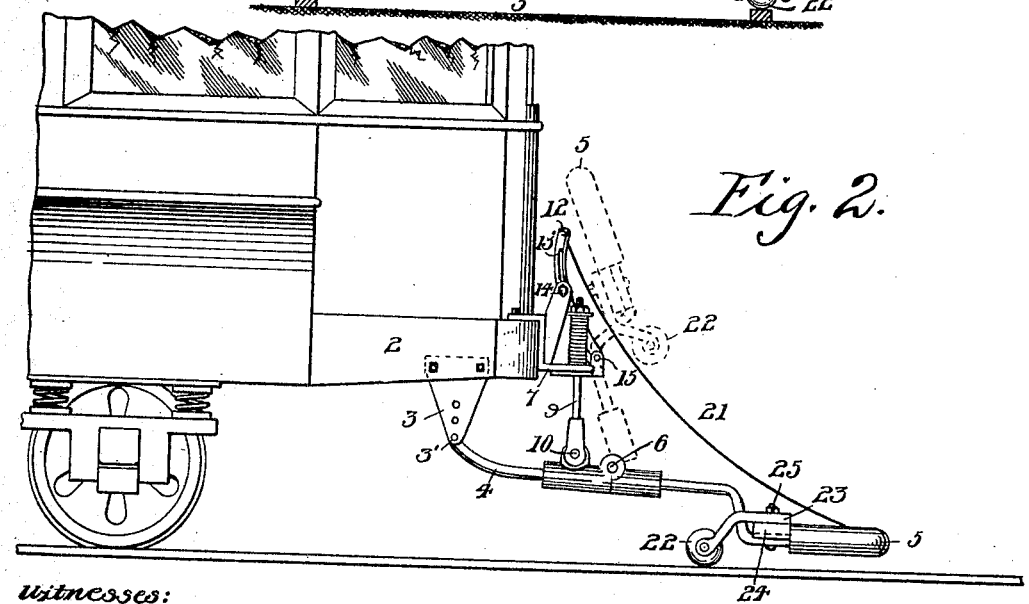

In the accompanying drawings, Figure 1 is a front elevation of the improved fender. Fig. 2 is a side view, the guard portion being shown turned upward in dotted lines, as when not in use. Fig. 3 is a view similar to Fig. 2, showing the position of the guard frame after it has been sprung and raised. Figs. 4 and 5 are detail views of the locking and releasing mechanisms operated by the trip frame. Fig. 6 is a detail view of one of the hanger rods, and Fig. 7 is a similar view of the rod locking and releasing plate. Figs. 8 and 9 are detail views of the caster.

Referring to the drawings, 2 designates the forward portion of the car frame or bumper, and depending therefrom at opposite sides are hangers 3 to which are adjustably hinged at 3' the rearward arms 4 of the forwardly extending guard frame 5. Arms 4 are broken and hinged at 6 so that frame 5 may be turned upward when not in use, as shown in dotted lines in Fig. 2. Hinge 3' being adjustable, the height of the fender may be varied as desired.

Secured to bumper 2 are brackets which consist of a horizontal portion 7 and a vertical portion 8, and extending upwardly through each bracket-part 7 is a rod 9 having its lower end pivotally connected at 10 to arm 4 forwardly from hanger 3. A coiled spring 11 is confined on the upper portion of rod 9 above bracket 7, as shown.

12 indicates the horizontal bar or member of the inverted bail-shaped trip frame which has its end portions 13 each hinged between its ends at 14 to the upright bracket-part 8, and secured at 15 to the lower extremity of the arm is plate 16 which is adapted to reciprocate beneath bracket part 7. This plate is formed with aperture 17, through which rod 9 freely passes, and with the aperture extension 18 of slot form. Rod 9 is slotted on opposite sides at 20 so as to be embraced by aperture-portion 18, at which time the rod is locked against vertical movement.

Hinge-bolt 14 extends through a slot 13' in frame arm 13, being clamped therein by nut 14', the bolt turning freely as a trunnion in bracket part 8. Thus, the exact adjustment and throw of the trip frame is obtained.

21 designates the netting, basket, or other similar element which forms the bottom of the fender, and which is connected at its forward end to the forward portion of guard frame 5, and at its upper rear end to bar 12 of the trip frame.

In operation, the guard frame is normally maintained in lowered position as in Figs. 1 and 2, this position being opposed to the upward pull of springs 11. The latter are maintained inactive by rods 9 being locked through the engagement of their slots 21 with slotted portion 18 of the rod aperture in plate 16, the upper part 12 of the trip frame being at such time in backward position and the extremities of arms 13 thereof in forward position. The weight of a person or other heavy object falling into net or basket 21 draws forward the trip frame, moving rearward the extremities of arms 13 and plates 16, with the result that the rod-slots 20 are disengaged, and with the rods thus freed, they are drawn upward by springs 11, thus lifting the guard frame, as shown in Fig. 3. This operates to prevent the object in the fender from rolling or falling therefrom.

Guard frame 4 is preferably provided with the spherical or ball-shaped casters 22 which are adapted normally to travel either on or slightly above the track rails, thus operating to prevent the forward portion of the fender from scraping on the track or road-bed when approaching up-grades, also when the adjustment of the fender is such that but for the casters the guard frame would stand too low. The roller elements of the casters being ball-shaped, readily maintain their position with relation to the rail, and when moved laterally at once catch the sides or base of the rail. Each of the caster mountings consists of a movable or roller-carrying part 23, and a fixed or base part 24, the latter being secured to frame 5. 25 is the pivot-bolt upon which the movable element oscillates when rounding curves. Fixed part 24 is formed with a curved depression 26, with lug 27 depending thereinto frame part 23, and arranged in this depression on opposite sides of the lug are springs 28 which hold part 23 and the roller normally centered, returning the same to center position after they have been turned to either one side or the other.

By the term netting employed in the claims, I include any and all forms of bottom structures that might be used for the purpose. The invention may be variously embodied, departing from the specific structures herein shown and described, without avoiding the spirit and scope of the appended claims.

I claim:—

1. In a car fender, the combination of a forwardly extending vertically movable frame, mechanism for holding the frame depressed, a netting or basket connected to the holding mechanism and to the forwardly extending frame and operating when a weight is placed upon it to exert a pull upon the holding mechanism sufficient to release the frame, and frame raising means operative when the frame is released.

2. The combination of a forwardly extending vertically movable guard frame, a trip frame above and rearward from the front portion of the guard frame, means for raising the guard frame, means operated by the trip frame for holding the guard frame depressed and for releasing the same, and a netting secured to the guard frame and to the trip frame and operating when a weight is placed thereon to so move the trip frame as to release the guard frame.

3. The combination of a vertically movable forwardly extending guard frame, rods extending upwardly therefrom, springs adapted to raise the rods and frame, a trip frame above and rearward from the front portion of the guard frame, devices operated by the trip frame for holding the rods depressed and for releasing the same, and a netting secured to the front portion of the guard frame and to the trip frame and operating when a weight is placed thereon to so move the latter as to release the rods.

4. The combination of a vertically movable forwardly extending guard frame, rods extending upwardly from the frame, brackets on the car through which the rods extend, springs confined between the upper ends of the rods and the brackets, a trip frame above and rearward from the front portion of the guard frame, rod holding and releasing devices operated by the trip frame, and a netting secured to the forward portion of the guard frame and to the trip frame and adapted when a weight is placed thereon to so move the trip frame as to release the rods and permit the springs to raise the guard frame.

5. The combination of a vertically movable upwardly extending guard frame, rods extending upwardly therefrom, springs for raising the rods and frame, a bail-shaped trip frame above and rearwardly from the front portion of the guard frame, rod engaging devices actuated by the trip frame and adapted when the latter is oscillated backwardly to hold the rods depressed and the guard frame in lowered position, and a netting secured to the forward portion of the guard frame, and to the trip frame and adapted when a weight is placed thereon to oscillate the guard frame forwardly and release the rods.

6. The combination of a vertically movable forwardly extending guard frame, rods projecting upwardly from the frame, brackets through which the rods extend, a bail-shaped trip frame having its end portions hinged above their lower extremities, plates beneath said brackets and secured to the extremities of the trip frame, each of said plates having a rod passage formed with an offset, and each of said rods so slotted as to be embraced and held by said offset, springs confined on the rods between their upper ends and said brackets, and a netting secured to the forward portion of the guard frame and to the trip frame and adapted when a weight is placed thereon to oscillate the latter and release the rods.

7. The combination with a car fender, of a caster adapted to oscillate thereon, and oppositely acting springs connected to the caster for holding it normally in line with the track.

8. The combination with a car fender, of casters depending therefrom and adapted each to oscillate on a vertical pivot, a lug projecting from the movable portion of the caster mounting, and springs at opposite sides of the lug for holding the caster normally centered.

9. The combination with a car fender, of casters depending therefrom, the mounting of each caster consisting of a fixed and a movable part, the fixed part having a recess, the movable part being pivoted to oscillate and having a lug depending into the recess, and springs in said recess at opposite sides of the lug.

In testimony whereof I affix my signature in presence of two witnesses.

GEORGE R. OWINGS.

Witnesses:
 HARRY N. BAKER,
 J. J. MEISEL.